(12) United States Patent
Yang et al.

(10) Patent No.: US 10,824,597 B2
(45) Date of Patent: Nov. 3, 2020

(54) CACHE FOLDER IDENTIFICATION METHOD AND DEVICE

(71) Applicant: Beijing Kingsoft Internet Security Software Co., Ltd., Beijing (CN)

(72) Inventors: Qidong Yang, Beijing (CN); Guoqiang Jiao, Beijing (CN); Nan Zhang, Beijing (CN); Yong Chen, Beijing (CN)

(73) Assignee: Beijing Kingsoft Internet Security Software Co., Ltd., Beijing (CN)

( * ) Notice: Subject to any disclaimer, the term of this patent is extended or adjusted under 35 U.S.C. 154(b) by 833 days.

(21) Appl. No.: 15/322,070

(22) PCT Filed: Jun. 24, 2015

(86) PCT No.: PCT/CN2015/082228
§ 371 (c)(1),
(2) Date: Dec. 23, 2016

(87) PCT Pub. No.: WO2016/000554
PCT Pub. Date: Jan. 7, 2016

(65) Prior Publication Data
US 2017/0147596 A1 May 25, 2017

(30) Foreign Application Priority Data

Jun. 30, 2014 (CN) .......................... 2014 1 0307299

(51) Int. Cl.
*G06F 16/00* (2019.01)
*G06F 16/17* (2019.01)
(Continued)

(52) U.S. Cl.
CPC ........ *G06F 16/1727* (2019.01); *G06F 16/122* (2019.01); *G06F 16/24552* (2019.01); *G06F 16/9574* (2019.01)

(58) Field of Classification Search
CPC .................................................. G06F 16/24552
See application file for complete search history.

(56) References Cited

U.S. PATENT DOCUMENTS

| 8,170,975 B1 * | 5/2012 | Qureshi | G06F 11/079 706/47 |
| 8,554,599 B2 * | 10/2013 | Ghosh | G06Q 10/063114 705/7.27 |
| 2006/0230234 A1 | 10/2006 | Bentolila et al. | |

FOREIGN PATENT DOCUMENTS

| CN | 102654872 A | 9/2012 |
| CN | 102970420 A | 3/2013 |
| CN | 103559299 A | 2/2014 |

OTHER PUBLICATIONS

International Search Report for Application No. PCT/CN2015/082228 dated Sep. 25, 2015.
PCT/CN2015/082228, Sep. 25, 2015, International Search Report.

* cited by examiner

*Primary Examiner* — Ajith Jacob
(74) *Attorney, Agent, or Firm* — Wolf, Greenfield & Sacks, P.C.

(57) ABSTRACT

A cache folder identification method and device, the method comprising: in the process of running target software, acquiring a plurality of sample values $x_1, x_2, \ldots x_n$ of the number of files in the target folder according to a preset rule, the target folder being a folder used in the process of running the target software, $n \geq 2$; according to a preset algorithm, calculating the statistical value of the plurality of sample values, the statistical value being used to represent the degree of dispersion of the sample values; determining whether the statistical value is greater than a preset first threshold; if so, identifying the target folder as a cache folder. The method has high identification efficiency, and can (Continued)

continuously monitor specific software without missing a cache folder.

13 Claims, 6 Drawing Sheets

(51) Int. Cl.
*G06F 16/11* (2019.01)
*G06F 16/957* (2019.01)
*G06F 16/2455* (2019.01)

CACHE FOLDER IDENTIFICATION METHOD AND DEVICE

CROSS-REFERENCE TO RELATED APPLICATIONS

This application is the national phase of International Application No. PCT/CN2015/082228, titled "CACHE FOLDER IDENTIFICATION METHOD AND DEVICE", filed on Jun. 24, 2015, which claims priority to Chinese Patent Application No. 201410307299.5, entitled "CACHE FOLDER IDENTIFICATION METHOD AND DEVICE", filed with the Chinese State Intellectual Property Office on Jun. 30, 2014, which applications are hereby incorporated by reference to the maximum extent allowable by law.

TECHNICAL FIELD

The present application relates to the field of mobile Internet, and more particular, to a method and device for identifying a cache folder.

BACKGROUND ART

In processes of surfing online, playing games and watching videos with a mobile terminal by a user, a large number of cache files will be generated locally in a mobile terminal, which are stored in cache folders, these cache files occupy system resources. When these cache files increase to a certain amount, operations of the mobile terminal will become very slow, thereby affecting the normal use of a user. Thus, these cache folders need to be deleted.

In order to delete these cache folders, firstly, it is required to be able to identify which files are the cache files that may be deleted.

An existing method for identifying a cache folder is to verify, by a tester, whether software can run properly after a folder corresponding to the software has been deleted on a server end, and if the software can run properly, then the folder is a cache folder. This method has very low efficiency, and due to limitations of human and material resources, it is not able to continuously monitor specific software, which usually resulting in missing a cache folder in the processing of some software.

SUMMARY OF INVENTION

Embodiments of the present application provide a cache folder identification method and device for solving the problem in the prior art that the efficiency of identifying a cache folder is very low, the technical solution of which is as follows:

According to a first aspect, embodiments of the present application provide a cache folder identification method, which may comprise:

acquiring, in a running process of a target software, a plurality of sample values: $x_1, x_2, \ldots x_n$ for the number of files in a target folder according to a preset rule, wherein the target folder is a folder that is used in the running process of the target software, and $n \geq 2$;

calculating a statistical value of the plurality of sample values according to a preset algorithm, wherein the statistical value is used to characterize discrete degree of the sample values;

determining whether the statistical value is greater than a preset first threshold; and if yes, identifying the target folder as a cache folder.

In a preferred implementation of the present application, the step of acquiring of a plurality of sample values $x_1, x_2, \ldots x_n$ for the number of files in a target folder according to a preset rule specifically comprises:

performing statistics for sample values for the number of files in the target folder at different times, and after the statistics is performed for ii times, acquiring a plurality of sample values: $x_1, x_2, \ldots x_n$ for the number of files in the target folder, wherein $n \geq 2$.

In a preferred implementation of the present application, the step of performing statistics for the sample values for the number of files in the target folder at different times specifically comprises:

performing statistics periodically for sample values for the number of files in the target folder at a preset time interval.

In a preferred implementation of the present application, the step of acquiring of a plurality of sample values: $x_1, x_2, \ldots x_n$ for the number of files in a target folder according to a preset rule specifically comprises:

according to a preset event for triggering statistics, in case that the preset event for triggering statistics occurs, performing statistics for sample values for the number of files in the target folder, and after the statistics is performed for II times, acquiring a plurality of sample values: $x_1, x_2, \ldots x_n$ for the number of files in the target folder, wherein $n \geq 2$.

In a preferred implementation of the present application, the step of acquiring of a plurality of sample values: $x_1, x_2, \ldots x_n$ for the number of files in a target folder according to a preset rule specifically comprises:

acquiring, respectively from n mobile terminals, the number of files in the target folder in each mobile terminal, and acquiring a plurality of sample values: $x_1, x_2, \ldots x_n$ for the number of files in the target folder, wherein $n \geq 2$.

In a preferred implementation of the present application, the step of calculating of the statistical value of the plurality of sample values according to a preset algorithm specifically comprises: calculating a variance of the plurality of sample values according to a formula of:

$$s^2 = \frac{\sum_{i=1}^{n}(x_i - \bar{x})^2}{n}$$

wherein $\bar{x}$ is arithmetic mean of $x_1, x_2, \ldots x_n$.

In a preferred implementation of the present application, the step of calculating of the statistical value of the plurality of sample values according to a preset algorithm specifically comprises: calculating a standard deviation of the plurality of sample values according to a formula of:

$$\sigma = \sqrt{\frac{\sum_{i=1}^{n}(x_i - \bar{x})^2}{n}}$$

wherein $\bar{x}$ is arithmetic mean of $x_1, x_2, \ldots x_n$.

In a preferred implementation of the present application, the step of calculating of the statistical value of the plurality of sample values according to a preset algorithm specifically comprises: calculating a range of the plurality of sample values according to a formula of:

$$R = x_{max} - x_{min}$$

wherein $x_{max}$ and $x_{min}$ are the maximum and minimum values of $x_1, x_2, \ldots x_n$ respectively.

In a preferred implementation of the present application, before the step of calculating of the statistical value of the plurality of sample values according to a preset algorithm, the method further comprises:

determining whether $x_1, x_2, \ldots x_n$ are all less than a preset second threshold, if not, continuing the calculating of the statistical value of the plurality of sample values according to the preset algorithm; and if yes, identifying the target folder as a non-cache folder.

In a preferred implementation of the present application, before the step of calculating of the statistical value of the plurality of sample values according to a preset algorithm, the method further comprises:

determining whether $x_1, x_2, \ldots x_n$ are all less than a preset third threshold, if yes, continuing the calculating of the statistical value of the plurality of sample values according to the preset algorithm; and if not, identifying the target folder as a cache folder.

In a preferred implementation of the present application, before the step of calculating of the statistical value of the plurality of sample values according to a preset algorithm, the method further comprises:

determining whether $x_1, x_2, \ldots x_n$ are all less than a preset second threshold, if $x_1, x_2, \ldots x_n$ are all less than the second threshold, identifying the target folder as a non-cache folder;

if at least one sample value is greater than the preset second threshold, further determining whether $x_1, x_2, \ldots x_n$ are all less than a preset third threshold, wherein the preset third threshold is greater than the preset second threshold;

if $x_1, x_2, \ldots x_n$ are all less than the third threshold, continuing the calculating of the statistical value of the plurality of sample values according to the preset algorithm; and if at least one sample value is greater than the preset third threshold, identifying the target folder as a cache folder.

A second aspect of the embodiments of the present application provides a device for identifying a cache folder. The device may comprise:

a sample value acquisition unit for acquiring, in a running process of a target software, a plurality of sample values: $x_1, x_2, \ldots x_n$ for the number of files in a target folder according to a preset rule, wherein the target folder is a folder that is used in the running process of the target software, and n≥2;

a statistical value calculation unit for calculating the statistical value of the plurality of sample values according to a preset algorithm, wherein the statistical value is used to characterize discrete degree of the sample values;

a statistical value determination unit for determining whether the statistical value is greater than a preset first threshold; and a cache folder identification unit for identifying the target folder as a cache folder if determination result from the statistical value determination unit is yes.

In a preferred implementation of the present application, the sample value acquisition unit is specifically used for:

performing statistics for sample values for the number of files in the target folder at different times, and after the statistics is performed for n times, acquiring a plurality of sample values: $x_1, x_2, \ldots x_n$ for the number of files in the target folder, wherein n≥2.

In a preferred implementation of the present application, the sample value acquisition unit is specifically used for:

performing statistics periodically for sample values for the number of files in the target folder at a preset time interval, and after the statistics is performed for n times, acquiring a plurality of sample values: $x_1, x_2, \ldots x_n$ for the number of files in the target folder, wherein n≥2.

In a preferred implementation of the present application, the sample value acquisition unit is specifically used for:

according to a preset event for triggering statistics, in case that the preset event for triggering statistics occurs, performing statistics for sample values for the number of files in the target folder, and after the statistics is performed for n times, acquiring a plurality of sample values: $x_1, x_2, \ldots x_n$ for the number of files in the target folder, wherein n≥2.

In a preferred implementation of the present application, the sample value acquisition unit is specifically used for:

acquiring, respectively from n mobile terminals, the number of files in the target folder in each mobile terminal, and acquiring a plurality of sample values: $x_1, x_2, \ldots x_n$ for the number of files in the target folder, wherein n≥2.

In a preferred implementation of the present application, the statistical value calculation unit is specifically used for: calculating a variance of the plurality of sample values according to a formula of:

$$s^2 = \frac{\sum_{i=1}^{n}(x_i - \bar{x})^2}{n}$$

wherein $\bar{x}$ is arithmetic mean of $x_1, x_2, \ldots x_n$.

In a preferred implementation of the present application, the statistical value calculation unit is specifically used for: calculating a standard deviation of the plurality of sample values according to a formula of:

$$\sigma = \frac{\sum_{i=1}^{n}(x_i - \bar{x})^2}{n}$$

wherein $\bar{x}$ is arithmetic mean of $x_1, x_2, \ldots x_n$.

In a preferred implementation of the present application, the statistical value calculation unit is specifically used for: calculating a range of the plurality of sample values according to a formula of:

$$R = x_{max} - x_{min}$$

wherein $x_{max}$ and $x_{min}$ are the maximum and minimum values of $x_1, x_2, \ldots x_n$ respectively.

In a preferred implementation of the present application, a first sample value determination unit and a non-cache folder identification unit are also included; wherein the first sample value determination unit is used for, before the statistical value calculation unit calculating the statistical value of the plurality of sample values according to a preset algorithm, determining whether $x_1, x_2, \ldots x_n$ are all less than a preset second threshold,
if not, triggering the statistical value calculation unit to calculate the statistical value of the plurality of sample values according to the preset algorithm; and
if yes, triggering the non-cache folder identification unit to identify the target folder as a non-cache folder.

In a preferred implementation of the present application, a second sample value determination unit is also included, which is used for, before the statistical value calculation unit calculating the statistical value of the plurality of sample values according to a preset algorithm,
determining whether $x_1, x_2, \ldots x_n$ are all less than a preset third threshold,
if yes, triggering the statistical value calculation unit to calculate the statistical value of the plurality of sample values according to the preset algorithm; and
if not, triggering the cache folder identification unit to identify the target folder as a cache folder.

In a preferred implementation of the present application, a first sample value determination unit, a second sample value determination unit and a non-cache folder identification unit are also comprised;
wherein the first sample value determination unit is used for, before the statistical value calculation unit calculating the statistical value of the plurality of sample values according to a preset algorithm,
determining whether $x_1, x_2, \ldots x_n$ are all less than a preset second threshold,
if $x_1, x_2, \ldots x_n$ are all less than the second threshold, triggering the non-cache folder identification unit to identify the target folder as a non-cache folder; and
if at least one sample value is greater than the preset second threshold, triggering the second sample value determination unit to further determine whether $x_1, x_2, \ldots x_n$ are all less than a preset third threshold, wherein the preset third threshold is greater than the preset second threshold;
if $x_1, x_2, \ldots x_n$ are all less than the third threshold, triggering the statistical value calculation unit to calculate the statistical value of the plurality of sample values according to the preset algorithm; and
if at least one sample value is greater than the preset third threshold, triggering the cache folder identification unit to identify the target folder as a cache folder.

A third aspect of embodiments of the present application provides an electronic device, which comprises:
a processor, a memory, communication interfaces and a bus;
the processor, the memory and the communication interfaces are connected and communicate via the bus with each other;
the memory stores executable program codes;
the processor carries out a program corresponding to the executable program codes by reading the executable program codes stored in the memory to perform a method for identifying a cache folder provided by the embodiments of the present application.

A forth aspect of embodiments of the present application provide a storage medium for storing application programs, which are used for performing a method for identifying a cache folder provided by the embodiments of the present application.

A fifth aspect of the embodiments of the present application provides an application program, which is used for performing a method for identifying a cache folder provided by the embodiments of the present application.

From the above technical solution, it can be seen that in the present application, by acquiring, in the running process of a target software, a plurality of sample values of the number of files in the target folder, and according to a preset algorithm, calculating the statistical value of the plurality of sample values, then the statistical value being compared with a preset first threshold, if the statistical value is greater than the preset first threshold, it can be determined that the target folder is a cache folder. Compared with the prior art, the identification efficiency is high, and continuously monitoring specific software can be realized without a missing cache folder.

BRIEF DESCRIPTION OF DRAWINGS

In order to describe the technical solution of the embodiments of the present application and the prior art more clearly, in the following, a brief description with reference to the accompanying drawings required to be used in the embodiments and the prior art will be given, obviously, the drawings in the following description are just some embodiments of the present application, for those ordinary skilled in the art, other drawings in accordance with these accompanying drawings can be obtained without any inventive efforts.

DETAILED DESCRIPTION OF EMBODIMENTS

Figure 1:
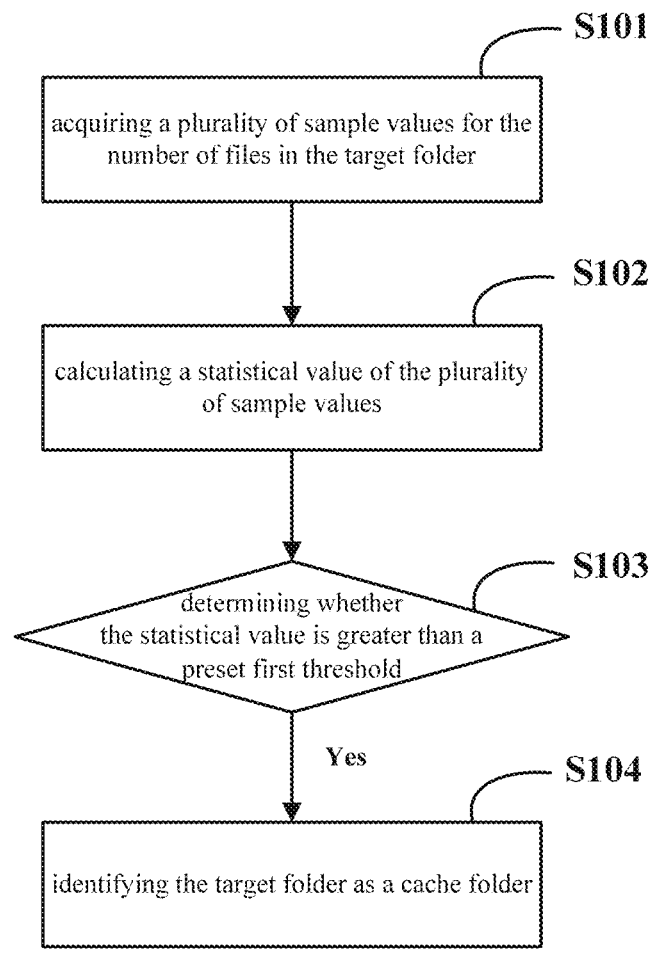
FIG. 1 is a first flowchart of a method for identifying a cache folder provided by embodiments of the present application.

In order to make the purpose, the technical solution and the advantages of the present application more clear, in the following, the present application are further described in detail with reference to the accompanying drawings and embodiments. It is obvious that the described embodiments are just a part of the embodiments of the present application instead of the entire ones. Based on the embodiments of the present application, all of other embodiments obtained by those ordinary skilled in the art without any inventive efforts are within the scope claimed by the present application.

It is well known that during running process, software may usually use two types of folders. One type of the folders store files required for software running, such as executable files, which can be called non-cache folders. And the other type of the folders temporarily store cache files during running process of software, which can be called cache folders.

One feature of a cache folder is that presence or absence of the cache folder will not affect normal running of software. Therefore, a method in the prior art for identifying whether a folder is a cache folder with this feature comprises:

a tester running a software on a server end, and finding folders that are used during running process of the software, and then deleting these folders manually; if the software can still continue to run properly after the deletion, then the folder have the feature of a cache folder, and determining that the folder is a cache folder. From the description for the method, it can be seen that the method requires a high participation degree of a tester. Since a person's energy is finite, the method has very low efficiency, and cannot ensure a continuous monitoring of a specific software, unless there are a large number of testers. This could result in missing a cache folder in the processing on software.

After a study, the applicant has found that when a software is running, the number of files in non-cache folders is essentially constant, or the variation is very small. But the number of files in cache files used by the software may have a significant fluctuation due to different run-time of software, even due to being used by different users.

According to this feature of a cache folder, it is envisaged by the applicant to determine whether a folder is a cache folder by using a statistical method.

According to the basic principle described above, the present application provides a method for identifying a cache folder, the method may comprise:

in a running process of a target software, acquiring a plurality of sample values $x_1, x_2, \ldots x_n$ for the number of files in the target folder according to a preset rule, wherein the target folder is a folder that is used in the running process of the target software, and $n \geq 2$;

calculating a statistical value of the plurality of sample values according to a preset algorithm, wherein the statistical value is used to characterize discrete degree of the sample values;

determining whether the statistical value is greater than a preset first threshold; and if so, identifying the target folder as a cache folder.

In the present application, according to the feature that the number of the files in cache folders has a significant fluctuation, by acquiring, in running process of a target software, a plurality of sample values for the number of files in the target folder, and calculating a statistical value of the plurality of sample values according to a preset algorithm, comparing the statistical value with a preset first threshold, and if the statistical value is greater than the preset first threshold the target folder may be determined as a cache folder. Compared with the prior art, due to a low participation degree of a tester, the identification efficiency is high, and continuously monitoring a specific software without missing a cache folder is possible.

In the following, the technical solution in embodiments of the present application will be described clearly and fully with reference to the accompanying drawings in the embodiments of the present application. Obviously, the described embodiments are just a part of the embodiments of the present application instead of the entire ones. Based on the embodiments of the present application, all of other embodiments obtained by those ordinary skilled in the art without any inventive efforts are within the scope protected by the present application.

As shown in FIG. 1, a method for identifying a cache folder may comprise following steps.

In S101, in running process of a target software, a plurality of sample values $x_1, x_2, \ldots x_n$ for the number of files in the target folder is acquired according to a preset rule, wherein the target folder is a folder that is used in the running process of the target software, and $n \geq 2$.

The design idea of the present application is to identify a cache folder by using a statistical method. Therefore, data samples for a statistical calculation need to be acquired firstly.

In the technical solution of the present application, the data sample refers to the acquired multiple sample values for the number of files in the target folder, and at least two sample values should be acquired. It can be understood that the greater the number of the sample values is, the closer the statistical data approaches to the actual condition, but the time cost is relatively high. Since the number of sample values does not affect implementation of the technical solution of the present application, it can be chosen by those skilled in the art according to the actual condition, and no limitations are made hereto in the present application.

When implementing the technical solution of the present application to identify a target folder that is used in the running process of target software, the identification may be performed in a certain order. For example, the identification may be performed sequentially in an alphabetical order of the folder names. It is also possible to exclude non-cache folders firstly according to the feature of the non-cache folder names, by which the workload can be further reduced and the identification speed can be improved.

In order to ensure that the target software can keep running all the time, and more cache files can be generated in the cache folders, the target software is preferably continuously operated. It is theoretically possible to achieve this continuous operation by manual way, but more human resources are required, thereby this is obviously inappropriate from a cost perspective. Thus, an automatic triggering technology can be preferably used to achieve a continuous operation of target software. The principle of the technology is that, in the running process of software, simulating the manual operation for the software, such as click, slide, etc, by which, a continuous operation for the target software can be achieved. Here, the automatic triggering technology belongs to the prior art, it can be obtained by those skilled in the art without any inventive efforts, thereby no detailed description is made hereto in the present application.

In the implementation process of the technical solution of the present application, a method for acquiring a sample value can be preset, and a plurality of sample values for the number of files in the target folder are acquired according to this method.

Since in the running process of a target software, the running time could be different, thereby generating different numbers of cache files. It is totally possible to perform statistics on the sample values for the number of files in the target folder at different times based on this principle. After the statistics is performed for n times, acquire a plurality of sample values: x1, x2, . . . xn for the number of files in the target folder may be acquired, wherein $n \geq 2$.

The time for performing statistics can be arbitrarily selected. However, it is easy to think that a certain time interval should be set between two statistics and the greater the time interval is, the more fluctuation in the number of files the statistical sample values can reflect. If the time interval is short, it is more likely that although the target folder is a cache folder, the sample values acquired each time are too approximate with each other due to the short time interval between the statistical executions. Also, the result obtained by performing the subsequent steps may be identified as a cache folder since the fluctuation for the number of files in the target folders is relatively small.

Certainly, a time interval can be set in advance, and a statistics for sample values for the number of files in the target folder can be periodically performed.

For setting of a time interval between every two statistics, it can be chosen by those skilled in the art according to the actual condition on the premise that the cache folder can be effectively identified, and no limitations are made hereto in the present application.

For an actual operation of sample acquirement, it can be carried out by a manual way, and can also be performed automatically by a device. Furthermore, this operation can be carried out either on a server side, or on a mobile terminal side.

In addition, an event for triggering statistics can be set, and when the preset event for triggering statistics occurs, the statistics for sample values of the number of files in the target folder can be performed, and after the statistics is implemented for n times, a plurality of sample values $x_1$, $x_2$, . . . $x_n$ for the number of files in the target folder can be acquired, wherein n≥2.

For example, an event for triggering statistics can be set such that, when the number of bytes in a target folder increases a certain threshold, statistics for sample values for the number of files in the target folder will be started to perform. The number of operations performed on a running target software can also be counted in advance. When the number of operations reaches a threshold, statistics for sample values for the number of files in the target folder will be started to perform.

Due to different running time or operations when the same target software is run by different mobile terminals, different numbers of cache files may be generated. Therefore the method for acquiring a plurality of sample values for the number of files in the target folder can also comprise: acquiring a plurality of sample values for the number of files in the target folder respectively from n mobile terminals. For the specific implementation, it is possible to upload the sample values to the server side after they are calculated statistically by separate mobile terminal.

The three methods for obtaining the number of files in a target folder mentioned above can be used either alone or in combination.

For example, the method of setting a time interval in advance and performing periodically statistics for sample values for the number of files in the target folder can be used in combination with the method of acquiring a plurality of sample values for the number of files in the target folder respectively from n mobile terminals.

In the specific implementation, statistics for sample values for the number of files in the target folder is performed periodically in each mobile terminal at a preset time interval; when a plurality of sample values are acquired by each mobile terminal, the plurality of sample values are send to a server; after the plurality of sample values sent from each mobile terminal are received by the server, the sample values are combined together to form a new data sample; then a subsequent identification step in accordance with the new data sample is executed. The advantages of this method are that it is more representative since the randomness of data is stronger.

Similarly, it is also possible to perform statistics for sample values for the number of files in the target folder in each mobile terminal according to a preset event for triggering statistics; when a plurality of sample values are acquired by each mobile terminal, the plurality of sample values are sent to a server; after the plurality of sample values sent from each mobile terminal are received by the server, the sample values are combined together to form a new data sample; then the subsequent identification step in accordance with the new data sample is executed.

In S102, the statistical value of the plurality of sample values is calculated according to a preset algorithm, wherein the statistical value is used to characterize discrete degree of the sample values.

In S103, it is determined whether the statistical value is greater than a preset first threshold.

In S104, in case that the statistical value is greater than the preset first threshold, it is determined that the target folder is a cache folder.

After a certain amount of sample values is acquired statistically, the statistical value of the sample values can be calculated by using a statistical algorithm, the statistical value may characterize discrete degree of the sample values, or to may reflect the fluctuation in the number of files in the target folder.

It should be mentioned that in statistics, all algorithms, which can characterize discrete degree of sample values, can be applied in the implementation solutions of the present application. Which algorithm being about to be used specifically should not be a limitation to the technical solution of the present application. However, the methods of variance, standard deviation and range are used to perform calculation preferably.

Hereinafter, the above three methods are described in accordance with specific examples.

(1) The discrete degree of the sample values is characterized by using a variance. The specific formula of variance is:

$$s^2 = \frac{\sum_{i=1}^{n}(x_i - \bar{x})^2}{n}$$

wherein $s^2$ is the variance, n is the number of the sample values, and $\bar{x}$ is the arithmetic mean of the sample values.

For example, when obtaining 4 sample values for the number of files in the target folder: 5, 10, 35 and 60,
first, calculating the arithmetic mean is calculated, $\bar{x}=5+10+35+110)/4=40$;
then, the variance is calculated, $s^2=(5-40)^2+(10-40)^2+(35-40)^2+(110-40)^2=7250$.

In this way, the obtained statistical value is 7250. When the preset first threshold is 5000, the statistical value is obviously greater than the preset first threshold, and therefore the target folder is identified as a cache folder.

(2) The discrete degree of the sample values is characterized by using a standard deviation. The specific formula of standard deviation is:

$$\sigma = \sqrt{\frac{\sum_{i=1}^{n}(x_i - \bar{x})^2}{n}}$$

wherein σ is the standard deviation, n is the number of the sample values, and $\bar{x}$ is the arithmetic mean of the sample values.

From the formula of variance and standard deviation, it can be known that the standard deviation is obtained by extracting the square root of the variance. Therefore, there is no big difference between applying variance and standard deviation in an implementation process, just hereby, the preset first threshold should be $\sqrt{5000}=71$.

Still taking the obtained 4 sample values of the number of files in the target folder being 5, 10, 35 and 60 as an example, after obtaining a variance by calculation, the standard deviation can be obtained by extracting the square root of the variance. By calculation, it can be obtained that σ=85. Obviously, the statistical value is still greater than the preset first threshold, therefore the target folder is identified as a cache folder.

(3) The discrete degree of the sample values is characterized by using a range. The specific formula of range is:

$$R = x_{max} - x_{min}$$

wherein R is the range, $x_{max}$ and $x_{min}$ are the maximum and minimum values of the sample values respectively.

It can be seen from this formula that, compared with variance and standard deviation, the calculation of the range is much more simple. However, since only the maximum and the minimum of the sample values are used in the calculation of the range, the information of the sample values are not fully used, therefore this method is applied to the case of small number of the sample values.

Still taking the obtained 4 sample values of the number of files in the target folder: 5, 10, 35 and 60 as example, the range is R=60−5=55, when the preset first threshold is 50, the target folder be identified as a cache folder.

It should be noted that the above-mentioned first threshold is obtained based on the analysis of large amounts of data by those skilled in the art, therefore, it is appropriate to use it as the identification criterion of a cache folder. The specific value of the first threshold may be determined by those skilled in the art according to an analysis, and no limitations are made hereto in the present application.

In the practical implementation of the present solution, the number of files in respective folder of the target software will be statistically counted in sequence, thereby acquiring a plurality of sample values for the number of files. However, for non-cache folders of the target software, the number of files in the folder is generally small, and the fluctuation in the number is also relatively small. It is obviously uneconomical if these folders are also calculated and the result is compared with the preset first threshold. Therefore, in the practical implementation, it is necessary to consider how to preclude these non-cache folders in the target software in advance.

Figure 2:
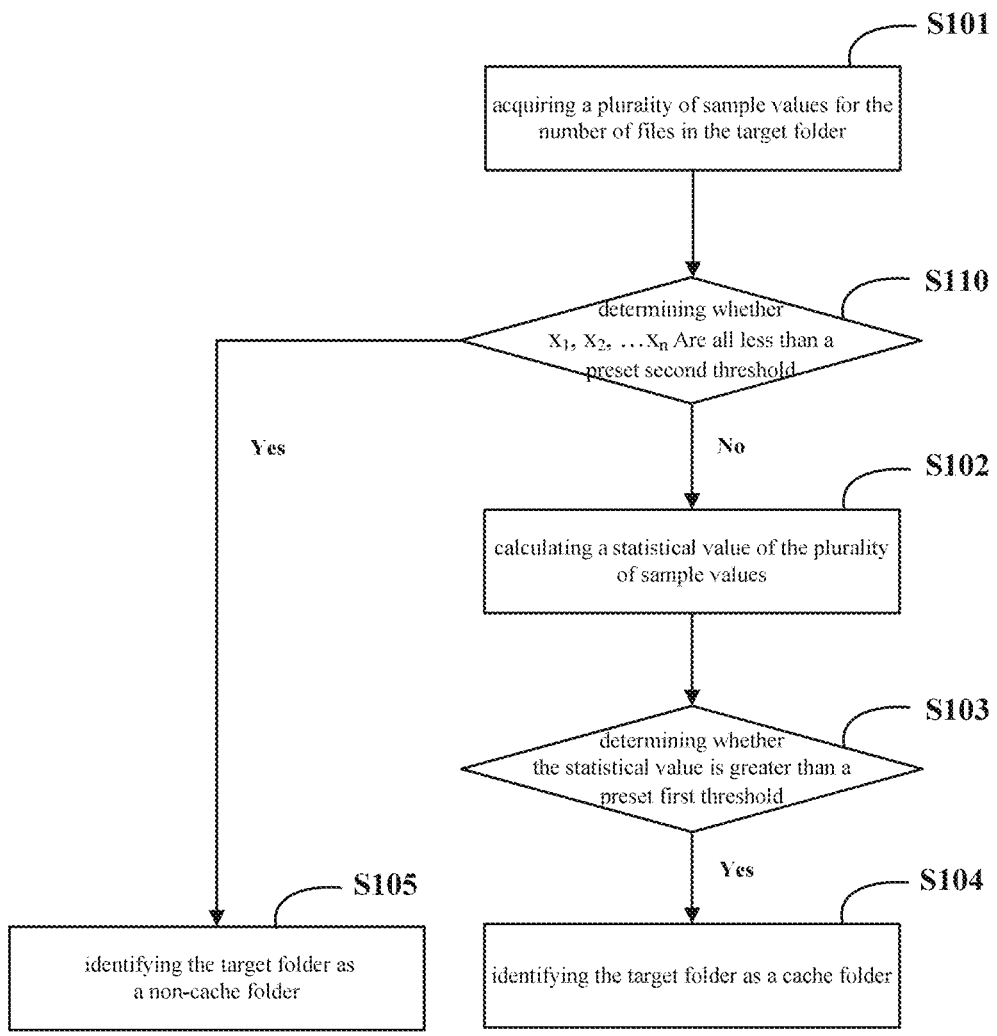
FIG. 2 is a second flowchart of a method for identifying a cache folder provided by embodiments of the present application.

In a preferred implementation of the present application, a determination mechanism may be added. For example, as shown in FIG. 2, before the calculating of the statistical value of the plurality of sample values according to a preset algorithm, the method further comprises: S110, determining whether $x_1, x_2, \ldots x_n$ are all less than a preset second threshold; if not, continuing the implementation of S102, calculating the statistical value of the plurality of sample values according to a preset algorithm; and if yes, then implementing S105 directly, identifying the target folder as a non-cache folder.

In this way, some folders obviously without any cache feature can be filtered in advance.

From another point of view, if a folder has cache features, besides a significant fluctuation in the number of files inside the folder, another feature is that the number of files in the cache folders is generally large, or rather it is much greater than the number of files in the non-cache folders. Based on the feature, the number of files in a large amounts of non-cache folders in software can be analyzed statistically in advance by those skilled in the art, and a preset third threshold is obtained, which means if the number of files in the folders of the target software is greater than the preset third threshold, the folder can be identified as a cache folder without further calculating the statistical value of the plurality of sample values. In this way, the amount of calculation can be further reduced.

Figure 3:
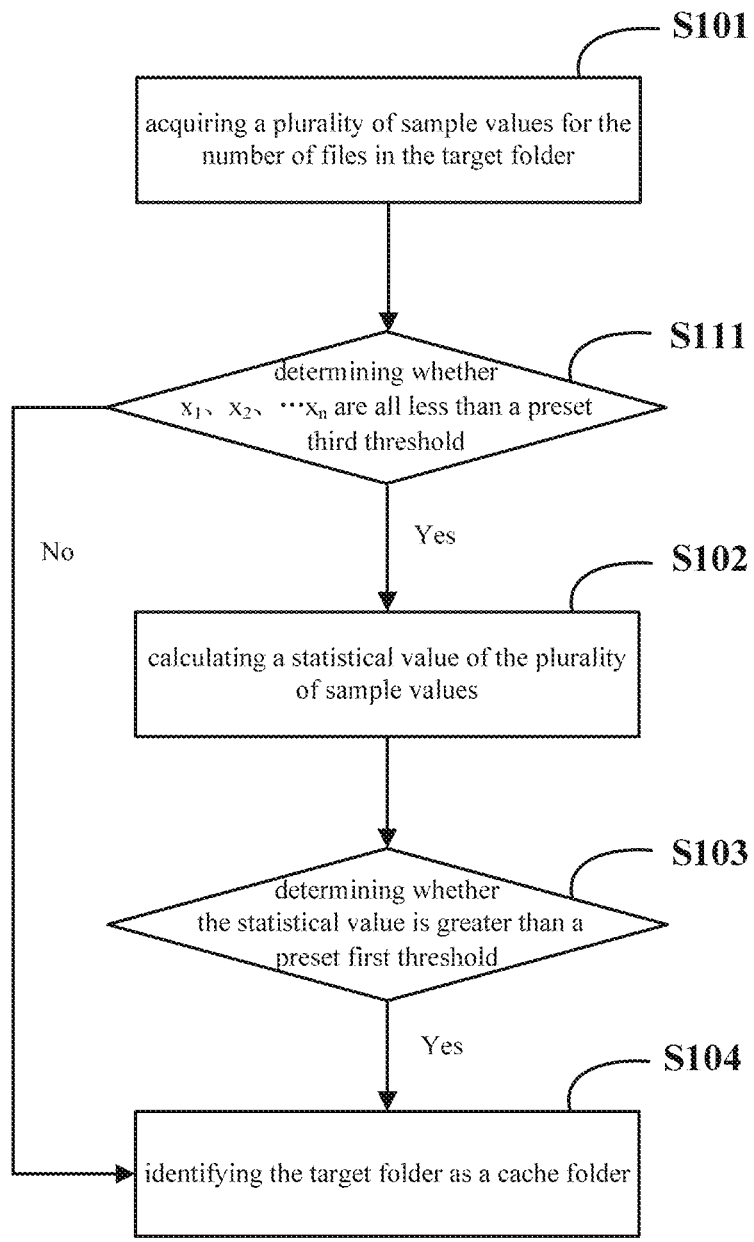
FIG. 3 is a third flowchart of a method for identifying a cache folder provided by embodiments of the present application.

In the practical implementation of the present solution, as shown in FIG. 3, before the calculating of the statistical value of the plurality of sample values according to a preset algorithm, it may comprises:

S111, determining whether $x_1, x_2, \ldots x_n$ are all less than a preset third threshold,
    if yes, continuing the execution of S102, calculating the statistical value of the plurality of sample values according to a preset algorithm;
    if not, then implementing S104 directly, identifying the target folder as a cache folder.

Figure 4:
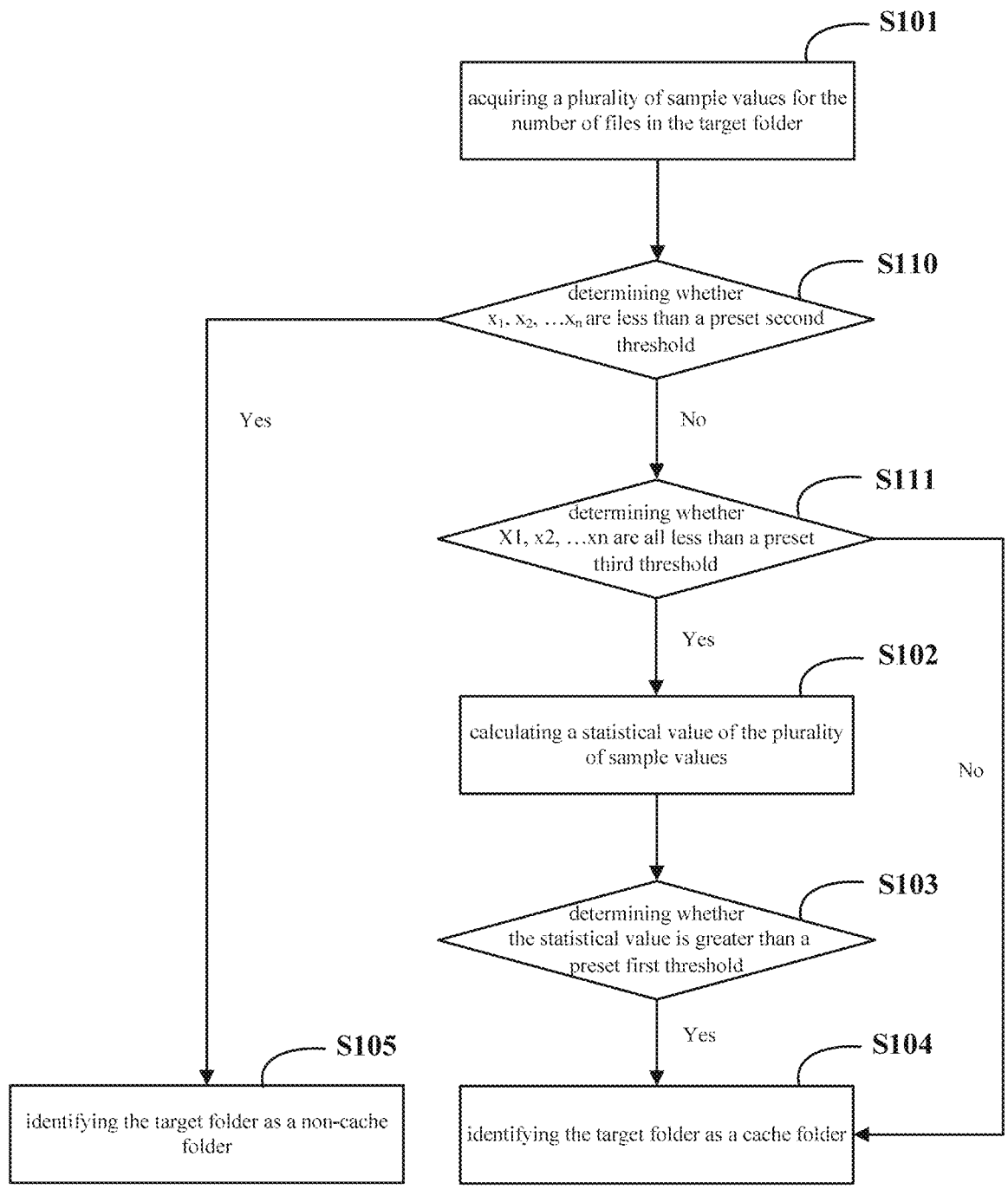
FIG. 4 is a forth flowchart of a method for identifying a cache folder provided by embodiments of the present application.

The two determination mechanisms mentioned above can be used either alone or in combination. For example, as shown in FIG. 4, before the calculating of the statistical value of the plurality of sample values according to a preset algorithm, S110 is performed first, in which it is determined whether $x_1, x_2, \ldots x_n$ are all less than a preset second threshold; if yes, then S105 is performed directly, in which the target folder is identified as a cache folder.

If the determination result is at least one sample value being greater than the preset second threshold, then S111 is performed directly, in which it is determined whether $x_1, x_2, \ldots x_n$ are all less than a preset third threshold; if so, then continuing the performing of S102, in which the statistical value of the plurality of sample values is calculated according to a preset algorithm.

If the determination result is at least one sample value being greater than the preset third threshold, S104 is performed directly, in which the target folder is identified as a cache folder. It is easy to think that the preset third threshold is greater than the preset second threshold.

Certainly, it is possible to implement a determination by using the third threshold first, then the second, and to implement corresponding steps in accordance with corresponding determination results.

It should be stated further that the technical solution of the present application can still be implemented without adding any determination mechanism. Therefore, the various embodiments of the present application can be implemented either alone or in combination partly or integrally. Which embodiment to use specifically can be chosen by those skilled in the art according to the actual condition, and no limitations are made hereto in the present application.

Figure 5:
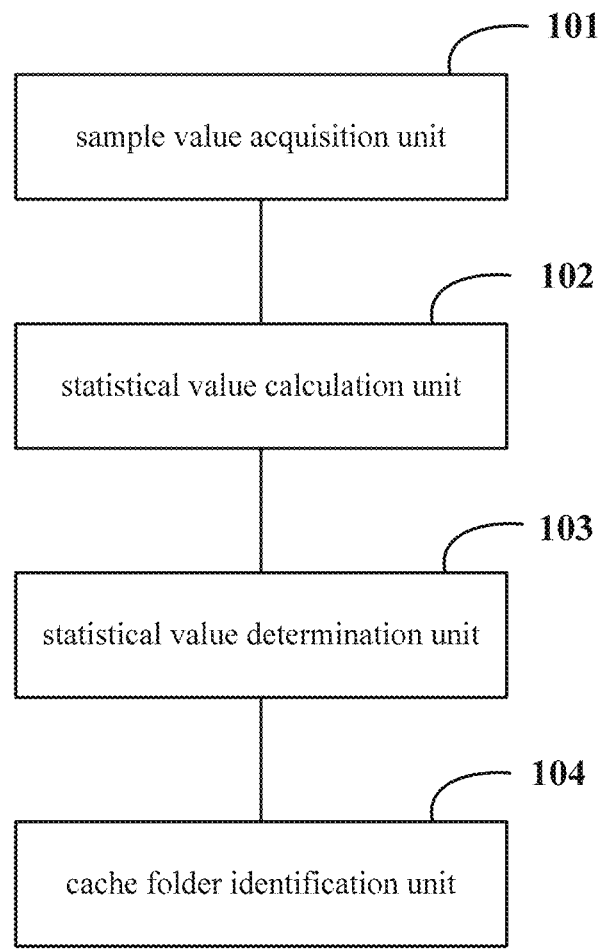
FIG. 5 is a first schematic structural diagram of a device for identifying a cache folder provided by embodiments of the present application.

According to the foregoing embodiments of the method, the present application also provides a device for identifying a cache folder. As shown in FIG. 5, the device may comprise:

a sample value acquisition unit 101 used for acquiring, in running process of a target software, a plurality of sample values: $x_1, x_2, \ldots x_n$ for the number of files in the target folder according to a preset rule, wherein the target folder is a folder that is used in the running process of the target software, and n≥2;

a statistical value calculation unit 102 used for calculating a statistical value of the plurality of sample values according to a preset algorithm, wherein the statistical value is used to characterize discrete degree of the sample values;

a statistical value determination unit 103 used for determining whether the statistical value is greater than a preset first threshold;

a cache folder identification unit 104 used for identifying the target folder as a cache folder if the determination result of the statistical value determination unit is yes.

In the present application, based on the feature of a significant fluctuation of the number of files in cache folders, by acquiring, in the running process of a target software, a plurality of sample values for the number of files in the target folder, and the statistical value of the plurality of sample values is calculated according to a preset algorithm, then the statistical value is compared with a preset first threshold, if the statistical value is greater than the preset first threshold, it can be determined that the target folder is a cache folder. Compared with the prior art, due to a low participation degree of a tester, the identification efficiency is high, and the monitoring of specific software can be realized without missing a cache folder.

In the specific implementation process of the technical solution of the present application, the sample value acquisition unit 101 can be used for: performing statistics for the sample values for the number of files in the target folder at different times, after the statistics is performed for n times, acquiring a plurality of sample values: $x_1, x_2, \ldots x_n$ for the number of files in the target folder, wherein n≥2.

It can also be used for: performing statistics periodically for the sample values for the number of files in the target folder according to a preset time interval, and after the statistics is performed for n times, acquiring a plurality of sample values $x_1, x_2, \ldots x_n$ for the number of files in the target folder, wherein n≥2.

It can also be used for: according to a preset event for triggering statistics, in the case of the preset event for triggering statistics having occurred, performing statistics for the sample values for the number of files in the target folder, and after the statistics is performed for n times, acquiring a plurality of sample values: $x_1, x_2, \ldots x_n$ for the number of files in the target folder, wherein n≥2.

It can also be used for: acquiring, respectively from n mobile terminals, the number of files in the target folder in each mobile terminal, and acquiring a plurality of sample values $x_1, x_2, \ldots x_n$ for the number of files in the target folder, wherein n≥2.

In the specific implementation process of the technical solution of the present application, the statistical value calculation unit 1102 can be used for: calculating the variance of the plurality of sample values according to the following formula, $$s^2 = \frac{\sum_{i=1}^{n}(x_i - \bar{x})^2}{n}$$

wherein $\bar{x}$ is the arithmetic mean of $x_1, x_2, \ldots x_n$.

It can also be used for: calculating the standard deviation of the plurality of sample values according to the following formula, $$\sigma = \frac{\sum_{i=1}^{n}(x_i - \bar{x})^2}{n}$$

wherein $\bar{x}$ the arithmetic mean of $x_1, x_2, \ldots x_n$.

It can also be used for: calculating the range of the plurality of sample values according to the following formula, $$R = x_{max} - x_{min}$$

wherein $x_{max}$ and $x_{min}$ are the maximum and minimum values of $x_1, x_2, \ldots x_n$ respectively.

In the specific implementation process of the technical solution of the present application, a first sample value determination unit and a non-cache folder identification unit are also included, wherein the first sample value determination unit 110 is used for, before the statistical value calculation unit 102 calculating the statistical value for the plurality of sample values according to a preset algorithm, determining whether $x_1, x_2, \ldots x_n$ are all less than a preset second threshold, if not, triggering the statistical value calculation unit 102 to calculate the statistical value of the plurality of sample values according to a preset algorithm; and if yes, triggering the non-cache folder identification unit to identify the target folder as a non-cache folder.

In the specific implementation process of the technical solution of the present application, a second sample value determination unit can be further included for, before the statistical value calculation unit 102 calculating the statistical value of the plurality of sample values according to a preset algorithm, determining whether $x_1, x_2, \ldots x_n$ are all less than a preset third threshold, if yes, triggering the statistical value calculation unit 102 to perform the step of calculating the statistical value of the plurality of sample values according to a preset algorithm; and if not, triggering the cache folder identification unit 104 to identify the target folder as a cache folder.

Figure 6:
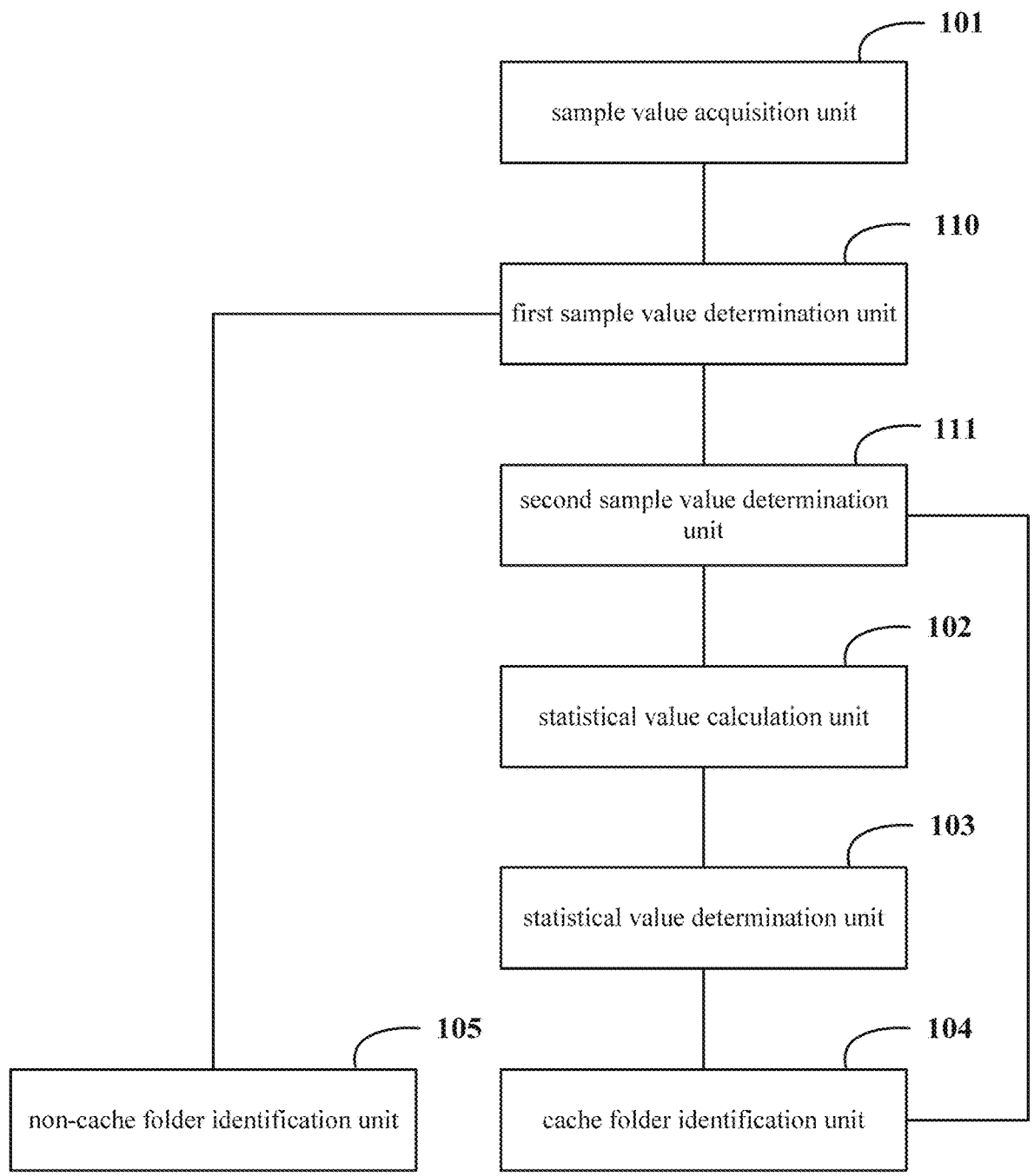
FIG. 6 is a second schematic structural diagram of a device for identifying a cache folder provided by embodiments of the present application.

In the practical implementation process of the technical solution of the present application, as shown in FIG. 6, the device also comprises a first sample value determination unit 110, a second sample value determination unit ill and a non-cache folder identification unit, wherein the first sample value determination unit is used for, before the statistical value calculation unit 102 calculating the statistical value of the plurality of sample values according to a preset algorithm, determining whether $x_1, x_2, \ldots x_n$ are all less than a preset second threshold, if $x_1, x_2,$ are all less than the second threshold, triggering the non-cache folder identification unit to identify the target folder as a non-cache folder; and if the determination result is that at least one sample value being greater than the preset second threshold, triggering the second sample value determination unit 111 to further determine whether $x_1, x_2, \ldots x_n$ are all less than a preset third threshold, wherein the third threshold is greater than the preset second threshold;

if $x_1, x_2, \ldots x_n$ are all less than the third threshold according to the determination result from the second sample value determination unit 111, triggering the statistical value calculation unit 102 to calculate the statistical value of the plurality of sample values according to a preset algorithm;

if at least one sample value is greater than the preset third threshold according to the determination result from the second sample value determination unit 111, then triggering the cache folder identification unit 104 to identify the target folder as a cache folder.

For the embodiments of the device or the system, since they are similar to the embodiments of the method, the description thereof is then relatively simple, it is possible to refer to the relevant contents in the description of the method in order to better understand the embodiments of the device or the system. The device and the system described above are merely illustrative, wherein the modules, which are described as separate components, may or may not be physically separate. Parts of or the entire modules can be chosen according to practical requirements to achieve the purpose of the embodiments of the present application. It is understandable and implementable for those skilled in the art without any inventive efforts.

Furthermore, embodiments of the present application further provide an electronic device, which may comprise:
- a processor, a memory, communication interfaces and a bus;
- the processor, the memory and the communication interfaces are connected and communicate via the bus with each other;
- the memory stores executable program codes;
- the processor carries out a program corresponding to the executable program codes by reading the executable codes stored in the memory to perform a method for identifying a cache folder provided by the embodiments of the present application; wherein the method for identifying a cache folder provided by the embodiments of the present application may comprises:
- in a running process of a target software, acquiring a plurality of sample values; $x_1, x_2, \ldots x_n$ for number of files in the target folder according to a preset rule, wherein the target folder is a folder that is used in the running process of the target software, and n≥2;
- calculating the statistical value of the plurality of sample values according to a preset algorithm, wherein the statistical value is used to characterize discrete degree of the sample values;
- determining whether the statistical value is greater than a preset first threshold; and
- if yes, identifying the target folder as a cache folder.

In addition, embodiments of the present application also provide a storage medium for storing application programs, which are used for performing a method for identifying a cache folder provided by the embodiments of the present application; wherein the method for identifying a cache folder provided by the embodiments of the present application may comprises:
- in a running process of a target software, acquiring a plurality of sample values: $x_1, x_2, \ldots x_n$ for number of files in the target folder according to a preset rule, wherein the target folder is a folder that is used in the running process of the target software, and n≥2;
- calculating the statistical value of the plurality of sample values according to a preset algorithm, wherein the statistical value is used to characterize discrete degree of the sample values;
- determining whether the statistical value is greater than a preset first threshold; and
- if yes, identifying the target folder as a cache folder.

In addition, the embodiments of the present application also provide an application program for performing a method for identifying a cache folder provided by the embodiments of the present application; wherein the method for identifying a cache folder provided by the embodiments of the present application may comprises:
- in a running process of a target software, acquiring a plurality of sample values: $x_1, x_2, \ldots x_n$ for number of files in the target folder according to a preset rule, wherein the target folder is a folder that is used in the running process of the target software, and n≥2;
- calculating the statistical value of the plurality of sample values according to a preset algorithm, wherein the statistical value is used to characterize discrete degree of the sample values;
- determining whether the statistical value is greater than a preset first threshold; and
- if yes, identifying the target folder as a cache folder.

The above disclosed embodiments are only the preferred ones of the present application, thereby they are not used to limit the scope of the claims of the present application, any modifications, equivalent alterations and improvements made in accordance with the spirit and the principle of the present application still belong to the scope of the present application.

What is claimed is:

1. A method for identifying a cache folder, characterized in that the method comprises:
   - acquiring, in a running process of a target software, a plurality of sample values: $x_1, x_2, \ldots x_n$ for the number of files in a target folder, wherein the target folder is a folder that is used in the running process of the target software, and n≥2;
   - calculating a statistical value of the plurality of sample values, wherein the statistical value is used to characterize discrete degree of the sample values;
   - determining whether the statistical value is greater than a preset first threshold; and
   - if yes, identifying the target folder as a cache folder.

2. The method of claim 1, characterized in that the step of acquiring of a plurality of sample values $x_1, x_2, \ldots x_n$ for the number of files in a target folder specifically comprises:
   - performing statistics for sample values for the number of files in the target folder at different times, and after the statistics is performed for n times, acquiring a plurality of sample values: $x_1, x_2, \ldots x_n$ for the number of files in the target folder, wherein n≥2.

3. The method of claim 2, characterized in that the step of performing statistics for the sample values for the number of files in the target folder at different times specifically comprises:
   - performing statistics periodically for sample values for the number of files in the target folder at a preset time interval.

4. The method of claim 1, characterized in that the step of acquiring of a plurality of sample values: $x_1, x_2, \ldots x_n$ for the number of files in a target folder specifically comprises:
   - according to a preset event for triggering statistics, in case that the preset event for triggering statistics occurs, performing statistics for sample values for the number of files in the target folder, and after the statistics is performed for n times, acquiring a plurality of sample values: $x_1, x_2, \ldots x_n$ for the number of files in the target folder, wherein n≥2.

5. The method of claim 1, characterized in that the step of acquiring of a plurality of sample values: $x_1, x_2, \ldots x_n$ for the number of files in a target folder specifically comprises:
   - acquiring, respectively from n mobile terminals, the number of files in the target folder in each mobile terminal, and acquiring a plurality of sample values: $x_1, x_2, \ldots x_n$ for the number of files in the target folder, wherein n≥2.

6. The method of claim 1, characterized in that the step of calculating of the statistical value of the plurality of sample values specifically comprises one of the following steps:

calculating a variance of the plurality of sample values according to a formula of:

$$s^2 = \frac{\sum_{i=1}^{n}(x_i - \bar{x})^2}{n}$$

wherein $\bar{x}$ Z is arithmetic mean of $x_1, x_2, \ldots x_n$;

calculating a standard deviation of the plurality of sample values according to a formula of:

$$\sigma = \sqrt{\frac{\sum_{i=1}^{n}(x_i - \bar{x})^2}{n}}$$

wherein $\bar{x}$ is arithmetic mean of $x_1, x_2, \ldots x_n$;

calculating a range of the plurality of sample values according to a formula of:

$$R = x_{max} - x_{min}$$

wherein $x_{max}$ and $x_{min}$ are the maximum and minimum values of $x_1, x_2, \ldots x_n$ respectively.

7. The method of claim 1, characterized in that before the step of calculating of the statistical value of the plurality of sample values, the method further comprises:

determining whether $x_1, x_2, \ldots x_n$ are all less than a preset second threshold, if $x_1, x_2, \ldots x_n$ are all less than the second threshold, identifying the target folder as a non-cache folder;

if at least one sample value is greater than the preset second threshold, further determining whether $x_1, x_2, \ldots x_n$ are all less than a preset third threshold, wherein the preset third threshold is greater than the preset second threshold;

if $x_1, x_2, \ldots x_n$ are all less than the third threshold, continuing the calculating of the statistical value of the plurality of sample values; and if at least one sample value is greater than the preset third threshold, identifying the target folder as a cache folder.

8. An electronic device for identifying a cache folder, characterized in that the electronic device comprises: a processor, a memory, communication interfaces and a bus;

the processor, the memory and the communication interfaces are connected and communicate via the bus with each other;

the memory stores executable program codes;

the processor carries out a program corresponding to the executable program codes by reading the executable program codes stored in the memory to perform the following steps:

acquiring, in a running process of a target software, a plurality of sample values: $x_1, x_2, \ldots x_n$ for the number of files in a target folder, wherein the target folder is a folder that is used in the running process of the target software, and n≥2;

calculating a statistical value of the plurality of sample values, wherein the statistical value is used to characterize discrete degree of the sample values;

determining whether the statistical value is greater than a preset first threshold; and if yes, identifying the target folder as a cache folder.

9. The electronic device of claim 8, characterized in that the step of acquiring of a plurality of sample values $x_1, x_2, \ldots x_n$ for the number of files in a target folder specifically comprises:

performing statistics for sample values for the number of files in the target folder at different times, and after the statistics is performed for n times, acquiring a plurality of sample values: $x_1, x_2, \ldots x_n$ for the number of files in the target folder, wherein n≥2.

10. The electronic device of claim 9, characterized in that the step of performing statistics for the sample values for the number of files in the target folder at different times specifically comprises:

performing statistics periodically for sample values for the number of files in the target folder at a preset time interval.

11. The electronic device of claim 8, characterized in that the step of acquiring of a plurality of sample values: $x_1, x_2, \ldots x_n$ for the number of files in a target folder specifically comprises:

according to a preset event for triggering statistics, in case that the preset event for triggering statistics occurs, performing statistics for sample values for the number of files in the target folder, and after the statistics is performed for n times, acquiring a plurality of sample values: $x_1, x_2, \ldots x_n$ for the number of files in the target folder, wherein n≥2.

12. The electronic device of claim 8, characterized in that the step of acquiring of a plurality of sample values: $x_1, x_2, \ldots x_n$ for the number of files in a target folder specifically comprises:

acquiring, respectively from n mobile terminals, the number of files in the target folder in each mobile terminal, and acquiring a plurality of sample values: $x_1, x_2, \ldots x_n$ for the number of files in the target folder, wherein n≥2.

13. The electronic device of claim 8, characterized in that the step of calculating of the statistical value of the plurality of sample values specifically comprises one of the following steps:

calculating a variance of the plurality of sample values according to a formula of:

$$s^2 = \frac{\sum_{i=1}^{n}(x_i - \bar{x})^2}{n}$$

wherein $\bar{x}$ is arithmetic mean of $x_1, x_2, \ldots x_n$;

calculating a standard deviation of the plurality of sample values according to a formula of:

$$\sigma = \sqrt{\frac{\sum_{i=1}^{n}(x_i - \bar{x})^2}{n}}$$

wherein $\bar{x}$ is arithmetic mean of $x_1, x_2, \ldots x_n$;

calculating a range of the plurality of sample values according to a formula of:

$$R = x_{max} - x_{min}$$

wherein $x_{max}$ and $x_{min}$ are the maximum and minimum values of $x_1, x_2, \ldots x_n$ respectively.

\* \* \* \* \*